United States Patent [19]

Nishimura et al.

[11] Patent Number: 5,758,796
[45] Date of Patent: Jun. 2, 1998

[54] PRESSURE VESSEL

[75] Inventors: Yasuhiro Nishimura, Ichinomiya; Teruo Kobayashi, Inazawa; Shingo Shimojima, Aichi-ken; Minoru Odagiri, Ichinomiya, all of Japan

[73] Assignee: Toyoda Gosei Co., Ltd., Aichi-ken, Japan

[21] Appl. No.: 686,706

[22] Filed: Jul. 25, 1996

[30] Foreign Application Priority Data

Jul. 25, 1995 [JP] Japan ................... 7-210092
Oct. 12, 1995 [JP] Japan ................... 7-292218

[51] Int. Cl.$^6$ ................................. F17C 1/06
[52] U.S. Cl. .................... 220/590; 220/592; 220/454; 220/455; 220/457; 220/653; 220/651
[58] Field of Search ................... 220/590, 592, 220/589, 588, 586, 581, 565, 564, 562, 445, 446, 414, 421, 454, 455, 457, 469, 651, 652, 653

[56] References Cited

U.S. PATENT DOCUMENTS

| | | | |
|---|---|---|---|
| 2,848,133 | 8/1958 | Ramberg | 220/590 |
| 3,079,038 | 2/1963 | Rossi et al. | 220/590 |
| 3,208,622 | 9/1965 | Trentham et al. | 220/421 |
| 3,368,708 | 2/1968 | Pflederer | 220/590 |
| 4,566,609 | 1/1986 | Hoffmeister | 220/590 |
| 4,778,073 | 10/1988 | Ehs | 220/590 |
| 5,284,996 | 2/1994 | Vickers | 220/590 |
| 5,518,141 | 5/1996 | Newhouse et al. | 220/590 |

FOREIGN PATENT DOCUMENTS

| | | | |
|---|---|---|---|
| 653681 | 12/1962 | Canada | 220/590 |
| 1625937 | 8/1970 | Germany | 220/590 |

Primary Examiner—Stephen J. Castellano
Attorney, Agent, or Firm—Cushman Darby & Cushman IP Group of Pillsbury Madison & Sutro LLP

[57] ABSTRACT

A pressure vessel includes a liner having an end wall assembly formed by connecting two rigid end wall members at a fixed distance from each other by a connecting member, and an elastic peripheral wall sheet fixed to the two end wall members so as to enclose a space between them. The two end wall members are made of aluminum alloy by an extrusion process. The connecting member is a pipe made of aluminum alloy by an extrusion process and having a large number of communicating holes in the pipe wall. The peripheral wall sheet is made of aluminum foil and is formed in a cylindrical shape so as to enclose the space between the two end wall members. Around the liner are provided a helical reinforcing layer and a hooped reinforcing layer which are both made of FRP. This pressure vessel is lightweight and can be easily produced at a low cost.

9 Claims, 15 Drawing Sheets

5,758,796

1

PRESSURE VESSEL

BACKGROUND OF THE INVENTION

1. Field of the Invention

This invention relates to a pressure vessel into which every kind of compressed gas such as CNG (compressed natural gas), every kind of liquefied gas such as LNG (liquefied natural gas and LPG (liquefied petroleum gas), or every other kind of pressurized substance can be charged.

2. Description of Related Art

Recently, automobiles running on CNG have been aggressively developed and put into practical use because they discharge little sulfur oxide or carbon monoxide. One of important subjects of this development is the development of a lightweight and inexpensive pressure vessel for CNG.

As a first conventional example, FIG. 14 shows a pressure vessel 50 for CNG. The pressure vessel 50 has a liner 51 made of an aluminum alloy including a cylindrical peripheral section 52, spherical end wall sections 53 on both sides thereof and neck sleeves 54 protruding outwardly from a central portion of each of the end wall sections 53. A hooped reinforcing layer 55 made of FRP (fiber-reinforced plastics) is disposed around the peripheral wall section 52. This section is formed by winding glass fiber in the circumferential direction of the peripheral wall section 52 and impregnating the fiber with epoxy resin.

In forming the liner 51, an aluminum alloy cylinder is first made by an extrusion process and is cut off to a fixed length. The aluminum alloy cylinder is then subjected to a spinning process until both ends are closed thereby forming the end wall sections 53 and the sleeves 54. Thereafter the sleeves 54 are pierced at the center thereof, and the entire pressure vessel is subjected to heat treatment.

The thickness of the liner 51 is about 17 mm so as to be able to withstand internal pressures exceeding 200 kg/cm$^2$.

As a second conventional example, FIG. 15 shows a pressure vessel 60 for CNG. The pressure vessel 60 has a liner 61 made of an aluminum alloy including a peripheral wall section 62, end wall sections 63 and sleeves 64 arranged as described above. However, reinforcing layers 65, 66 are provided doubly around the liner 61. The helical reinforcing layer 65 is made of FRP and is formed by winding glass fiber in the lengthwise direction of the peripheral section 62 in such a manner as to pass over the end wall sections 63 on both sides of the vessel and impregnating the fiber with epoxy resin. The hooped reinforcing layer 66 is disposed around the layer 65 and is made of FRP. The hooped reinforcing layer is formed by winding glass fiber in the circumferential direction of the peripheral wall section 62 and impregnating the fiber with epoxy resin.

The liner 61 is formed in the same manner as the first conventional example, but the thickness of the liner 61 is smaller than that of the first conventional example because of the helical reinforcing layer 65. The thickness of the layer is approximately 5~6 mm in the peripheral section 62 and 10~12 mm in the end wall sections 63. The thickness differs with the section because the thickness of the end portions increases from 5~6 mm to 10~12 mm after the spinning process.

However, the foregoing conventional examples have the following problems.

The liners 51, 61 are continuous liners made of aluminum alloy cylinders formed by the extrusion and spinning processes. Therefore, the processing method and the material to be used are limited. Further, a large capacity of processing equipment and complicated operation are required, and therefore, the cost of equipment and processing is increased. As a result, both the pressure vessels 50, 60 are very expensive, and accordingly limit the use of CNG automobiles.

Moreover, there is a lower limit of the thickness capable of undergoing the extrusion process, and therefore it is very difficult to make an aluminum alloy cylinder having a small thickness. Further, if the aluminum alloy cylinder having a small thickness is subjected to the spinning process, there is a tendency for the cylinder to buckle. If the thickness is set to about 17 mm like the liner 51 of the first conventional example, these problems do not arise, but on the other hand, the weight is increased. While the thickness of the liner 61 of the second conventional example is smaller, the lower limit of the thickness is still in the range of 5~6 mm or 10~12 mm as described above, and the vessel is still relatively heavy. Therefore, the pressure vessels 50, 60 raise a problem that fuel consumption and weight balance of the automobiles mounted with these pressure vessels are deteriorated.

SUMMARY OF THE INVENTION

It is an object of the present invention to solve the above-described problems to make it possible to produce a lightweight pressure vessel easily and at a low cost.

In order to achieve this object, according to the present invention, there is provided a pressure vessel comprising a cylindrical peripheral wall section and two end wall sections disposed at both ends of the peripheral wall section. The two end wall sections are connected to each other by means of a connecting member extending within the pressure vessel.

According to an aspect of the present invention, the two end wall sections are rigid end wall members disposed at a fixed distance from each other by means of the connecting member thereby forming an end wall assembly. An elastic peripheral wall sheet is so fixed to the two end wall sections so as to enclose a space between the end wall members. Hereinafter, a liner is designated by the end wall assembly and the peripheral wall sheet. Finally, a reinforcing layer is provided around the liner.

The end wall members can be made as follows:

1. The end wall member can be made of cast metal. As for the casting process, it is desirable to adopt die casting suitable for small-thickness vessels, particularly vacuum die casting, laminar flow die casting, Acurad die casting, non-porous die casting or the like which is free from the formation of blowholes.
2. The end wall member can be made of press-worked metal.
3. The end wall member can be made of fiber-reinforced plastics.

It is preferred that the metallic end wall member has a thickness between 1~4 mm, more preferably between 1~3 mm, and most preferably between 1~2 mm.

As for the connecting member, the following examples are suitable:

1. The connecting member can be formed from a pipe having a connecting hole in the pipe wall.
2. The connecting member can be made from a bar.
3. The connecting member can be made from a member having a cross-sectional form having an H, T or similar cross-section.

The peripheral wall sheet has, thanks to the elasticity thereof, the effect of moderating the fluctuation of stress caused by increase and decrease in pressure of the vessel. The peripheral wall sheet is not limited to any particular one. Any sheet that prevents the permeation of a charged substance and resists the corrosion by the charged substance is suitable. The following sheets are suitable:

1. The peripheral wall sheet can be made of an impermeable material which prevents the charged substance from passing through. For instance, aluminum foil, stainless steel foil and the like are suitable.
2. The peripheral wall sheet comprising a permeable main body sheet through which the charged substance is allowed to pass and an impermeable layer through which the charged substance is not allowed to pass disposed on the main body sheet is suitable. For instance, the sheet can be formed by coating a resin sheet as the main body sheet with an aluminum layer by means of vacuum evaporation, cathode sputtering, ion plating or the like.

The peripheral wall sheet need not be fixed to the end wall members. The sheet can be fastened by means of a clip or adhesive, for instance.

The "reinforcing layer" is only limited to a particular sheet having the strength to withstand the internal pressure required of the vessel. But a reinforcing layer made of fiber-reinforced plastics is desirable from the viewpoint that it possesses both reinforcing performance and light weight.

More preferably, the reinforcing layer comprises a helical reinforcing layer made of fiber-reinforced plastics which is formed by winding fiber around the liner in the lengthwise direction of the peripheral sheet in such a manner as to pass over the end wall members on both sides and impregnating the fiber with resin; and a hooped reinforcing layer made of fiber-reinforced plastics which is formed by winding fiber around the helical reinforcing layer in the circumferential direction of the peripheral sheet and impregnating the fiber with resin.

The material of the fiber is not limited to any particular one but includes any fiber having the reinforcing performance. Such fibers include glass, carbon, poly-p-phenylene terephthalamide, nylon, polyethylene, polyester and the like.

The resin is not limited and includes epoxy resin, vinyl ester resin, unsaturated polyester resin and the like.

According to another aspect of the present invention, there is provided a pressure vessel in which the two end wall sections are made of synthetic resin and include a sleeve made of either metal or synthetic resin fixed to a central portion of the end wall section. Both of the sleeves are connected by means of the connecting member.

The end wall section can be made from polyethylene, polypropylene, ABS, saturated polyester, polyamide, polycarbonate and the like, or the ones obtained by filling these resins with reinforcing fiber.

In this aspect, both sleeves may be connected by means of the connecting member so as to be either at a fixed distance from each other or movable in moderation. Further, the peripheral wall section is not limited to a special one but may be either the one made of elastic sheet or the cylindrical one made of synthetic resin.

Moreover, by constructing the vessel in such a manner that at least one of the sleeves is formed with a cylindrical shape having a bottom wall defining a through hole therein and by extending an end portion of the connecting member through the through hole, and securing a nut screwed onto external thread of the connecting member so that the connecting member is fastened to the bottom wall through a spring member the movement of the sleeve can be allowed and regulated.

DETAILED DESCRIPTION OF THE PREFERRED EMBODIMENTS

Description will now be given of the present invention in connection with preferred embodiments of a pressure vessel for charge of CNG and related gases with reference to the drawings.

Figure 1:
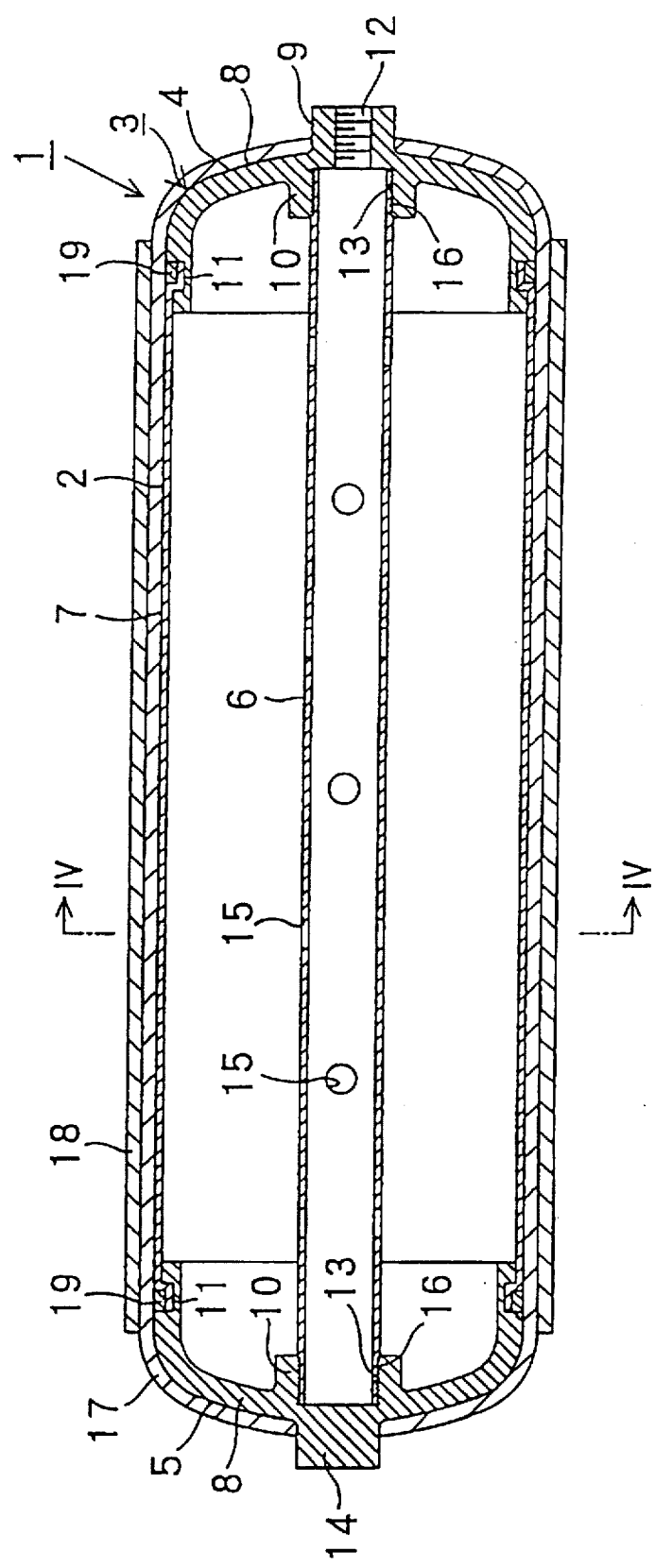
FIG. 1 is a cross-sectional view of a pressure vessel according to an embodiment of the present invention.
Figure 2:
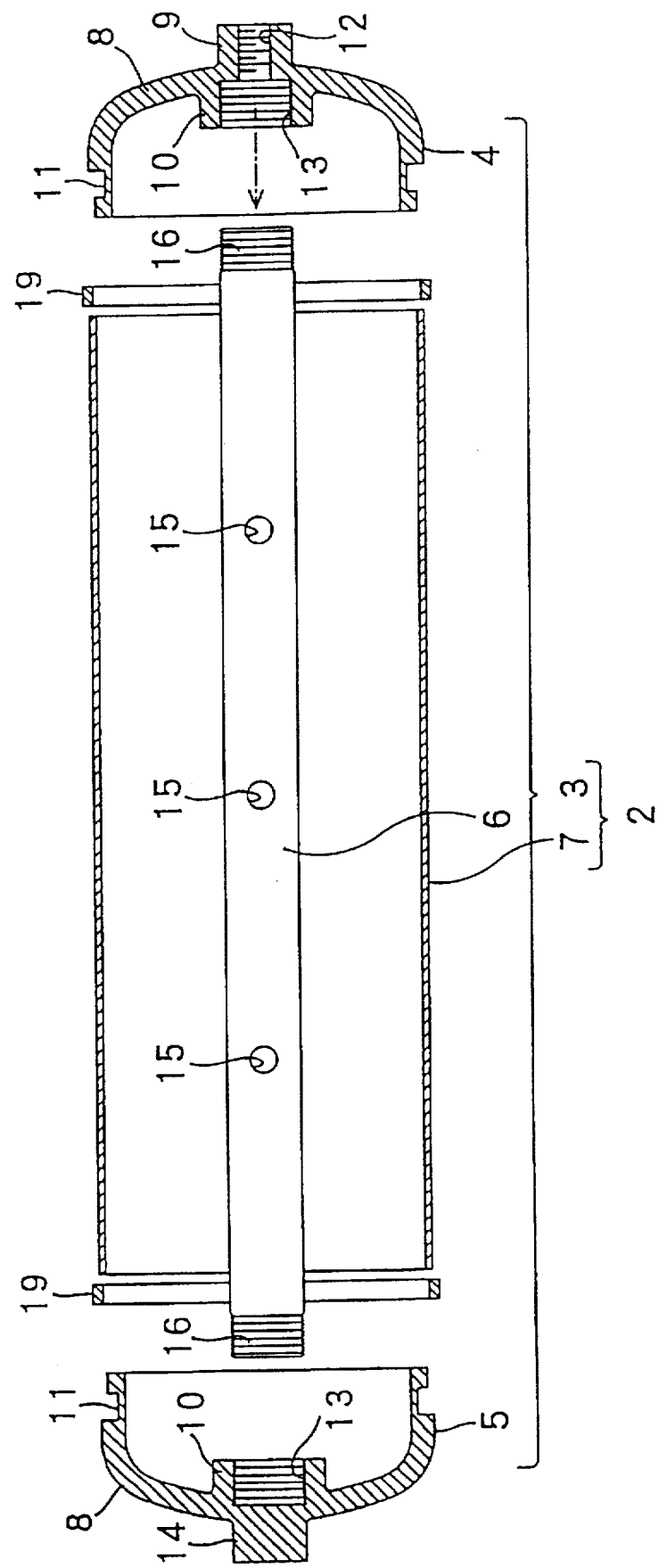
FIG. 2 is an exploded cross-sectional view of a liner of the same pressure vessel as that of FIG. 1.
Figure 3:
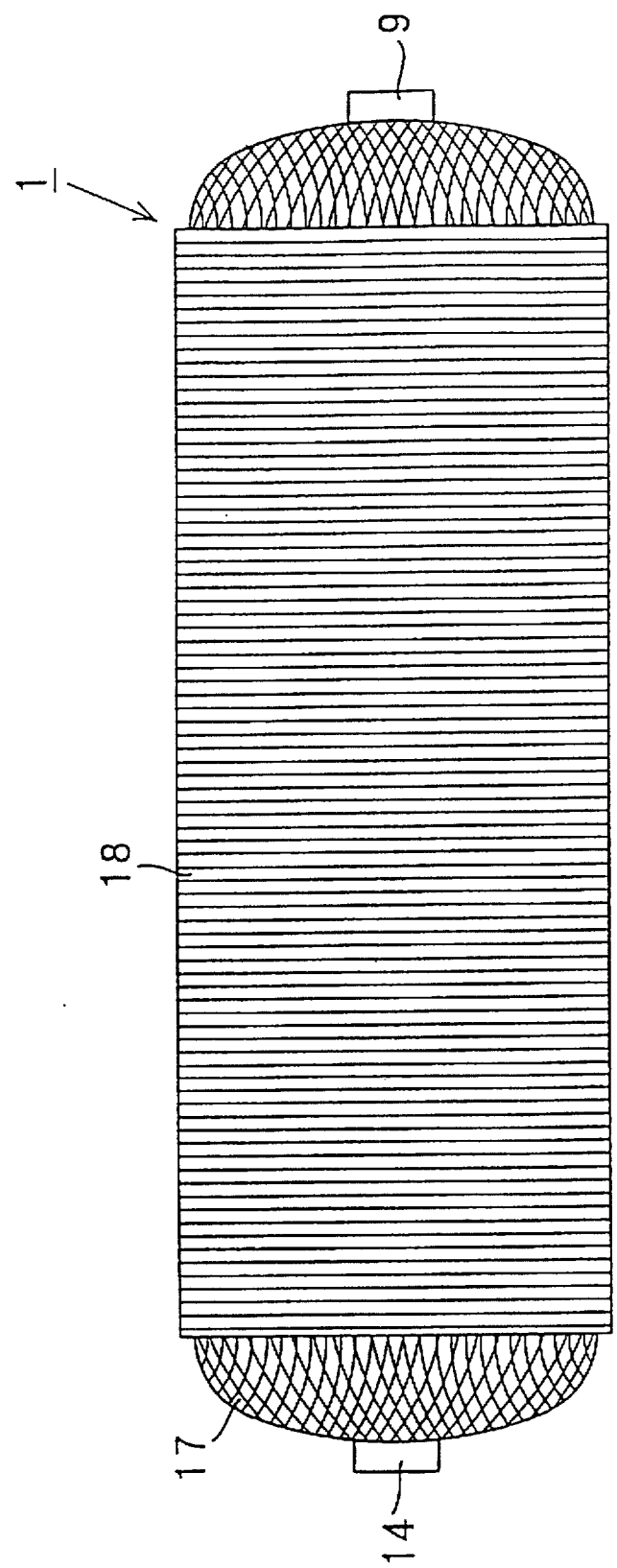
FIG. 3 is a front view of the same pressure vessel.
Figure 4:
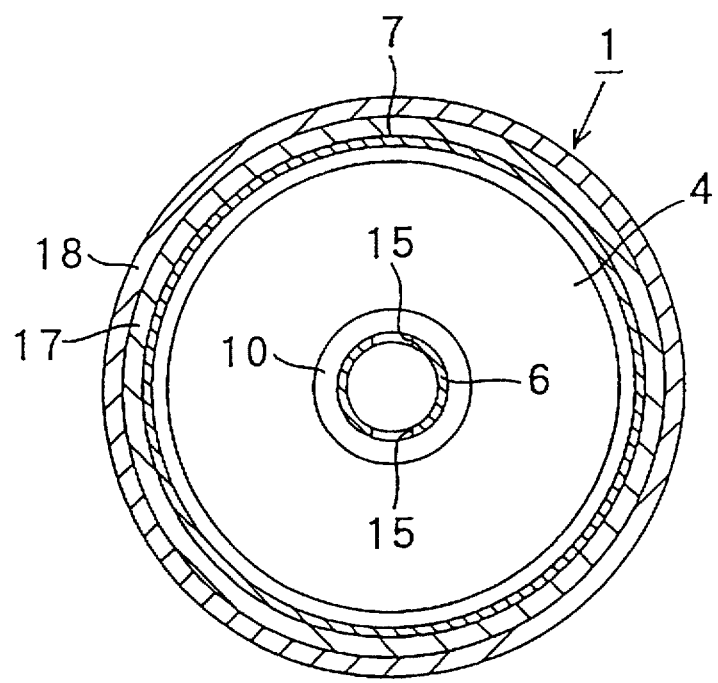
FIG. 4 is a cross-sectional view taken along the line IV—IV of FIG. 1.

First, FIGS. 1–4 show a pressure vessel 1 according to a first embodiment. A liner 2, which is the innermost layer of the pressure vessel 1, includes an end wall assembly 3 having two rigid end wall members 4, 5 connected by means of a connecting member 6 at a fixed distance from each other, and an elastic peripheral wall sheet 7 fixed to the two end wall members 4, 5 to enclose a space between them, as shown in FIG. 1.

The two end wall members 4, 5 are made of an aluminum alloy by a die casting process.

The right end wall member 4 includes a spherical end wall portion 8, a sleeve portion 9 projecting outwardly from a central portion of the end wall portion 8, and a connecting protrusion 10 projecting inwardly from the central portion of the end wall portion 8, all of which is formed as an integral body. A circumferential fitting groove 11 is concavely formed in an outer peripheral surface of the end wall portion 8. The sleeve portion 9 is formed in the center thereof with an internal thread hole 12 for connecting a pipe (not shown) through which CNG is let in and out, while the connecting protrusion 10 is formed in the center thereof with an internal thread hole 13 to which the connecting member 6 is screwed. Both the internal thread holes 12, 13 communicate with each other.

Meanwhile, the left end wall member 5 includes a spherical end wall portion 8, a boss portion 14 projecting outwardly from a central portion of the end wall portion 8, and a connecting protrusion 10 projecting inwardly from the central portion of the end wall portion 8, all of which is formed as an integral body. The end wall potion 8 is concavely formed with a fitting groove 11 and the connecting protrusion 10 is formed with an internal thread hole 13, in the same manner as the right end wall member. A thickness of each end wall portion 8 is made as thin as 2~5 mm.

The connecting member 6 is a pipe made of an aluminum alloy by an extrusion process and having a large number communicating holes formed in the pipe wall providing additional face into which the CNG can be charged. An external thread 16 is cut on an outer peripheral surface of each end portion of the connecting member 6. By screwing the external threads 16 to the internal thread holes 13 in the two end wall members 4, 5, both end wall members 4, 5 are connected to each other.

The peripheral wall sheet 7 is made of aluminum foil and is formed into a cylindrical shape so as to enclose the space between the two end wall members 4, 5. Both ends of the peripheral wall sheet 7 are caught in the fitting grooves 11 member end wall members 4, 5 and is fastened by means of ring clips 19 fitted thereon providing an air tight fit.

The liner 2 constructed as described above has an inner diameter of 250~450 mm and an overall length of 500~1000 mm. The liner 2, which employs the peripheral wall sheet 7, can not withstand an internal pressure reaching 200 kg/cm$^2$ alone. It is therefore the main function of the liner 2 to prevent permeation of CNG and serve as a core around which glass fiber is wound.

Reinforcing layers 17, 18 are provided doubly around the liner 2. Namely, around the liner 2 is provided a helical reinforcing layer 17 made of FRP which is formed by winding the glass fiber in the lengthwise direction of the peripheral wall sheet 7 in such a manner as to pass over the end wall members 4, 5 on both sides and impregnating the fiber with epoxy resin. Further, around the helical reinforcing layer 17 is provided a hooped reinforcing layer 18 made of FRP which is formed by winding the glass fiber in the circumferential direction of the peripheral wall sheet 7 and impregnating the fiber with epoxy resin.

In forming the reinforcing layers 17, 18, the interior of the liner 2 is pressurized by compressed air to make the peripheral wall sheet 7 taught, and the fiber is uniformly wound around the liner 2 at an angle at which the glass fiber effectively shows the strength characteristics while the liner 2 is supported at the sleeve portion 9 and the boss portion 14 and rotated in the required direction. The thickness of the reinforcing layers 17, 18 is in the range of 3~7 mm. However, it is also possible to make the helical reinforcing layer 17 thinner or dispense with the helical reinforcing layer 17 in a case where the strength of the end wall members 4, 5 is sufficiently enhanced.

According to the pressure vessel 1 of this embodiment, the liner 2 is comprised by the two end wall members 4, 5, the connecting member 6 and the peripheral wall sheet 7, and therefore, it is possible to apply a suitable manufacturing method to every section to thereby reduce the cost of equipment and manufacturing. This invention makes it possible to produce the pressure vessel 1 at low cost.

Further, the two rigid end wall members 4, 5 are connected by the connecting member 6 to form the end wall assembly 3. Therefore, the peripheral wall sheet 7 need not have the function of connecting the end wall members 4, 5, and accordingly, the peripheral wall sheet 7 is not required to have lengthwise strength. The radial strength can be sufficiently compensated for by the reinforcing layers 17, 18. Aluminum foil is a good end data for the peripheral wall sheet 7, which is very thin, lightweight and inexpensive. This makes it possible to reduce the weight of the pressure vessel 1 and hence to improve the fuel consumption and weight balance of the automobile mounted with this pressure vessel 1.

FIGS. 5~9 show cross sections of end wall assemblies 3 of pressure vessels according to second to sixth embodiments. In these embodiments, the method of connecting the end wall members 4, 5 by means of the connecting member is the only difference from the first embodiment. Members common to the first embodiment are not illustrated in these drawings.

Figure 5:
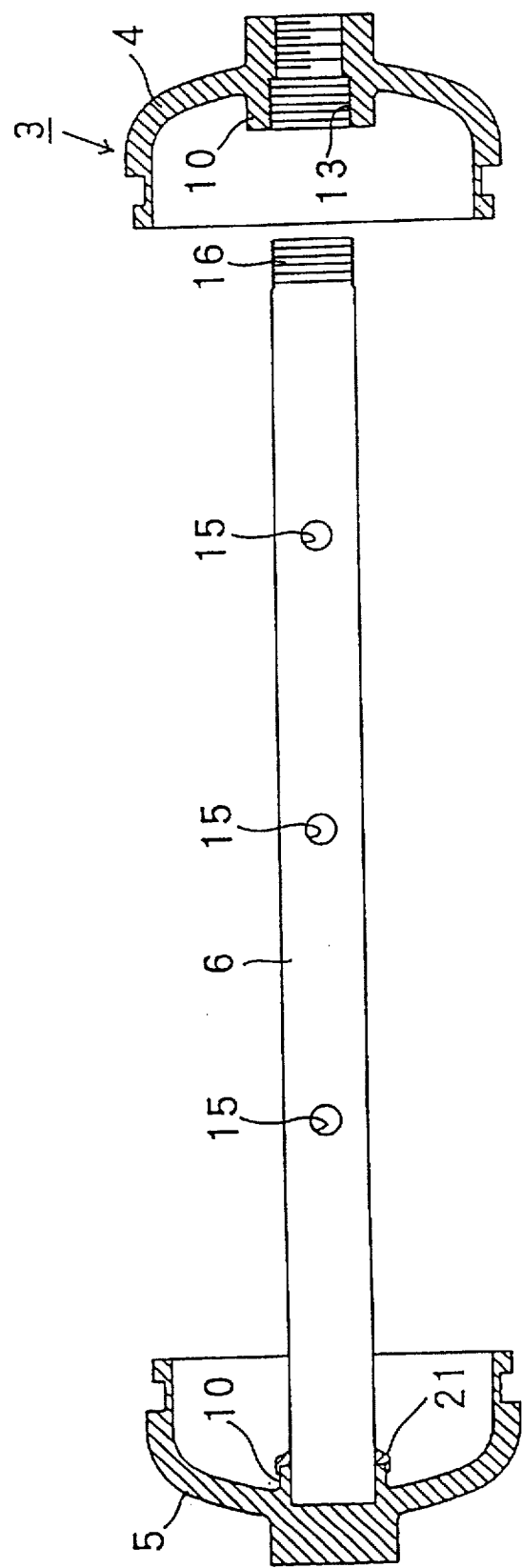
FIG. 5 is a cross-sectional view showing essential portions of an end wall assembly used in a pressure vessel according to another embodiment of the present invention.

In the second embodiment of FIG. 5, the connecting member 6 is screwed into the connecting protrusion 10 of the end wall member 4 at the right end thereof, while it is fixed to the connecting protrusion 10 of the end wall member 5 by means of a weld 21 at the left end thereof.

Figure 6:
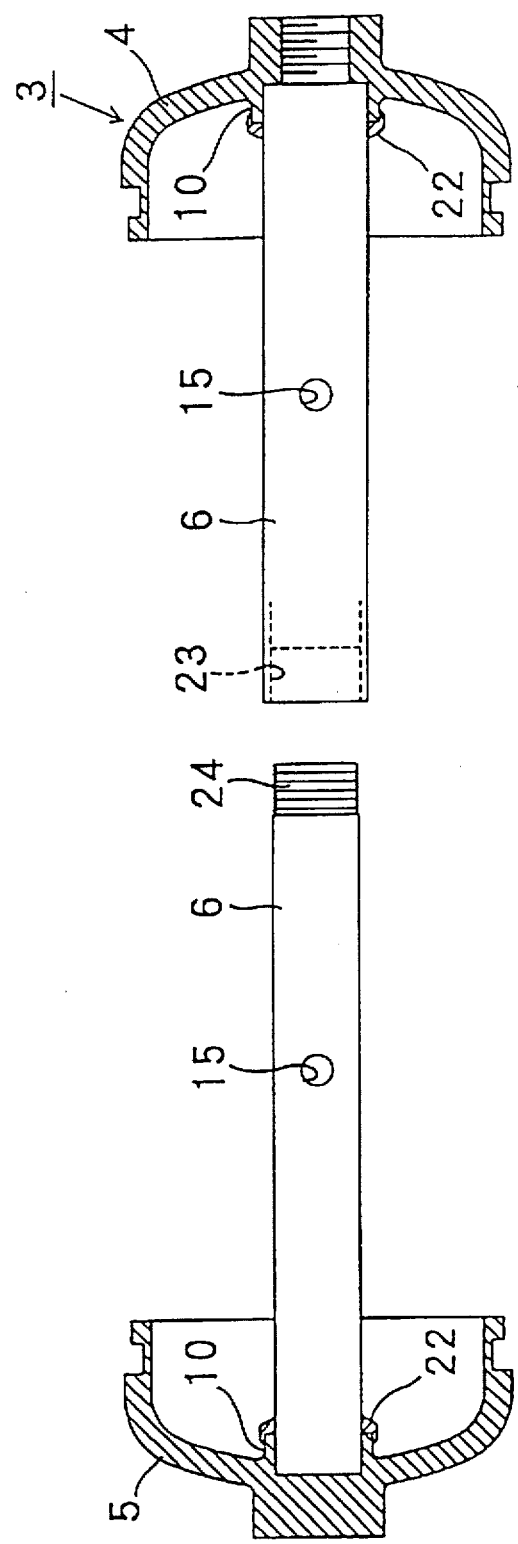
FIG. 6 is a cross-sectional view showing essential portions of an end wall assembly used in a pressure vessel according to still another embodiment of the invention.

In the third embodiment of FIG. 6, the connecting member 6, is formed by dividing it into two parts. Each part is fixed respectively to the connecting protrusions 10 of the end wall members 4, 5 at the ends opposite to the divided ends. The parts of the connecting member 6 are connected together by screwing an internal thread 23 and an external thread 24, cut on these facing ends respectively, to each other.

Figure 7:
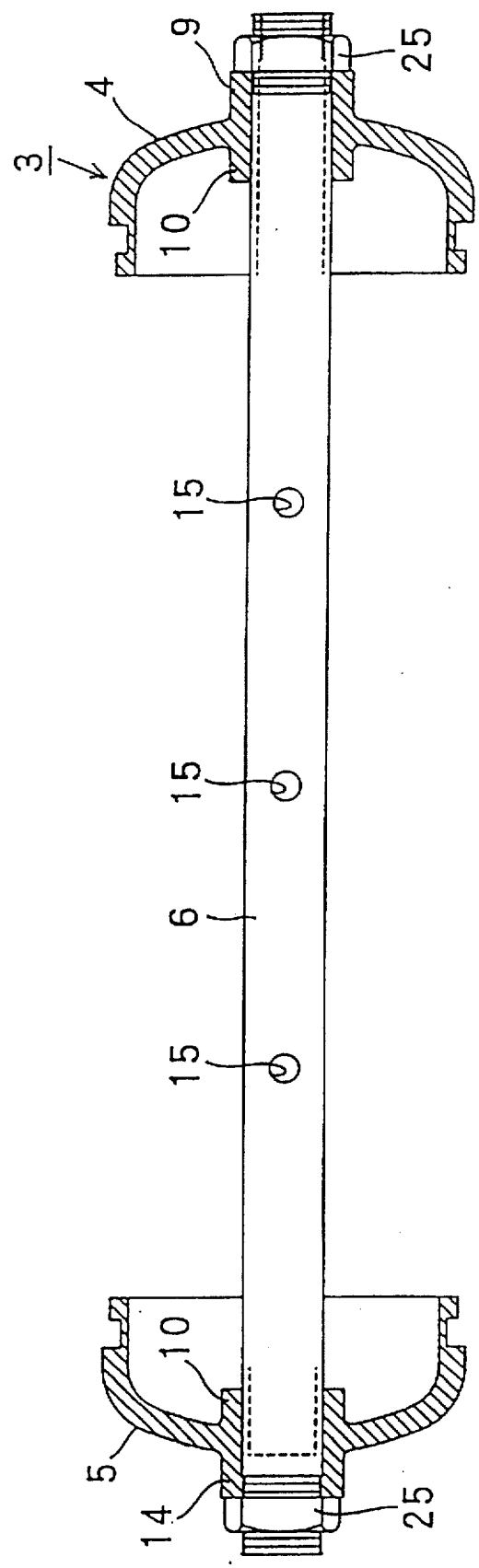
FIG. 7 is a cross-sectional view showing essential portions of an end wall assembly used in a pressure vessel according to a further embodiment of the invention.

In the fourth embodiment of FIG. 7, the connecting member 6 extends through the end wall members 4, 5 and is screwed thereto by means of nuts 25 at both ends. A pipe (not shown) is to be connected to the right end of the connecting member 6 by means of an internal thread cut on an inner peripheral pipe surface thereof. The left end of the connecting member 6 is closed.

Figure 8:
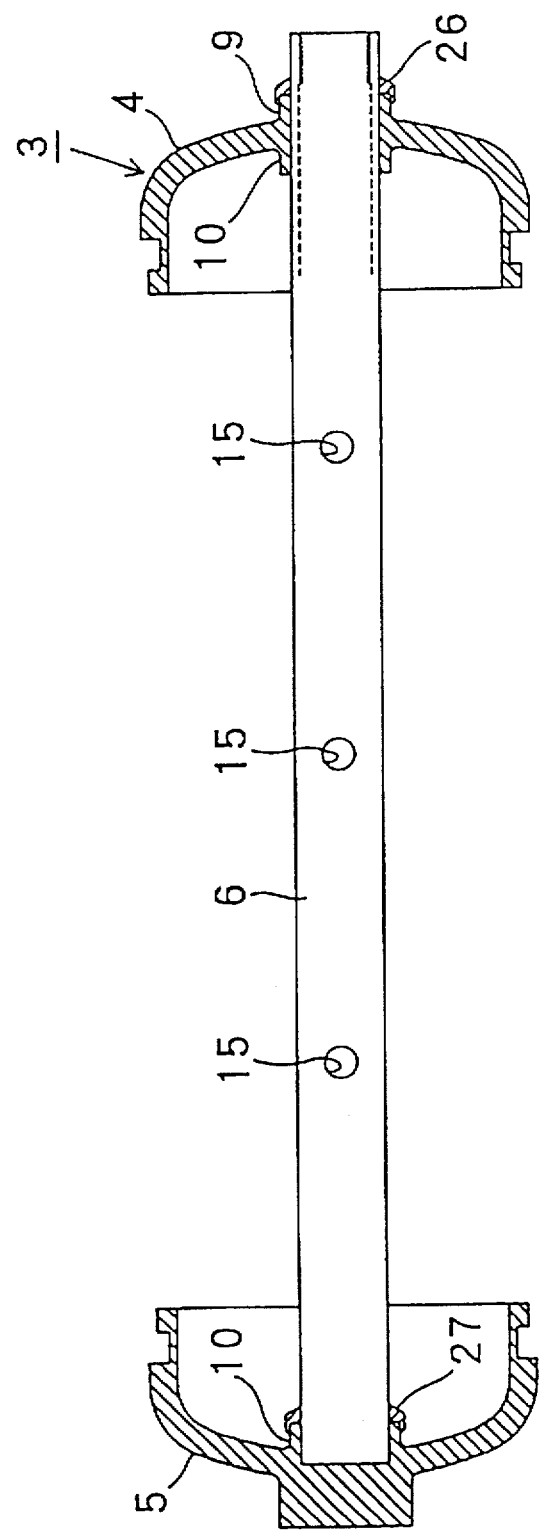
FIG. 8 is a cross-sectional view showing essential portions of an end wall assembly used in a pressure vessel according to a still further embodiment of the invention.

In the fifth embodiment of FIG. 8, the connecting member 6 extends through the end wall member and is fixed to the sleeve portion 9 by means of a weld 26 at the right end thereof, while it is fixed to the connecting protrusion 10 of the end wall member 5 by means of a weld 27 at the left end thereof. A pipe (not shown) is to be connected to the right end of the connecting member 6 by means of an internal thread cut on an inner peripheral pipe surface thereof.

Figure 9:
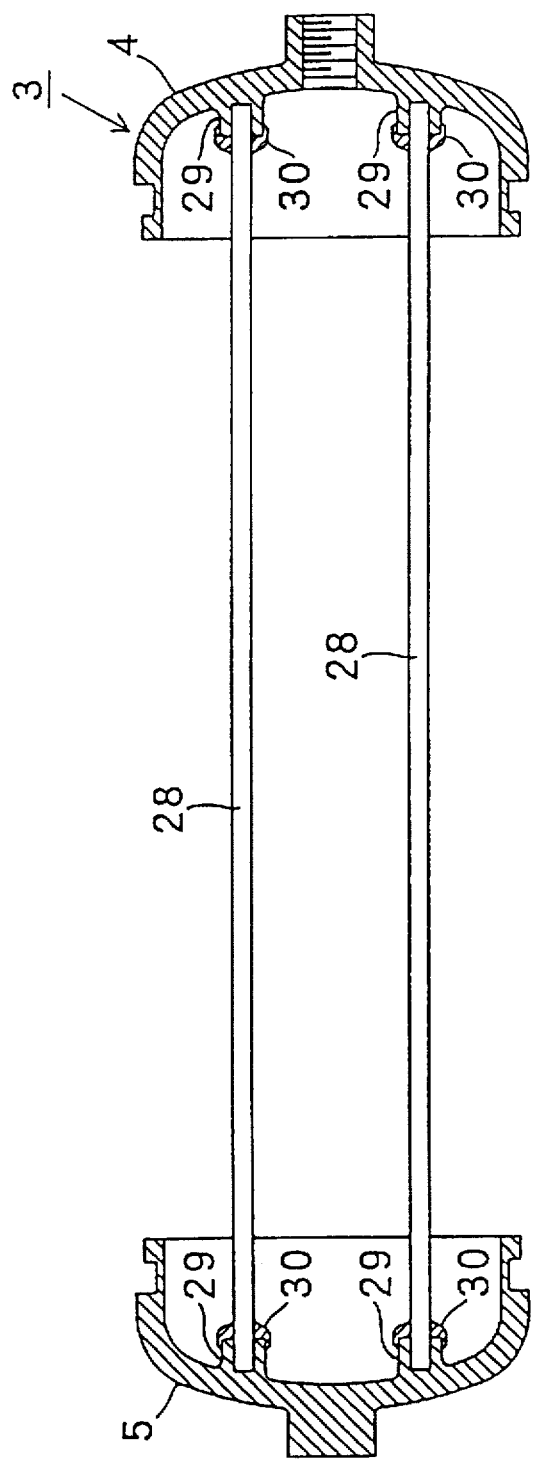
FIG. 9 is a cross-sectional view showing essential portions of an end wall assembly used in a pressure vessel according to a different embodiment of the invention.

In the sixth embodiment of FIG. 9, a connecting member 28 is a bar made of an aluminum alloy by an extrusion process. A plurality of connecting members 28 are fixed at both ends to a plurality of connecting protrusions 29 formed on the end wall members 4, 5 by means of welds 30.

According to the pressure vessels employing these end wall assemblies 3 of the second to sixth embodiments, the results of the first embodiment can be achieved.

Figure 10:
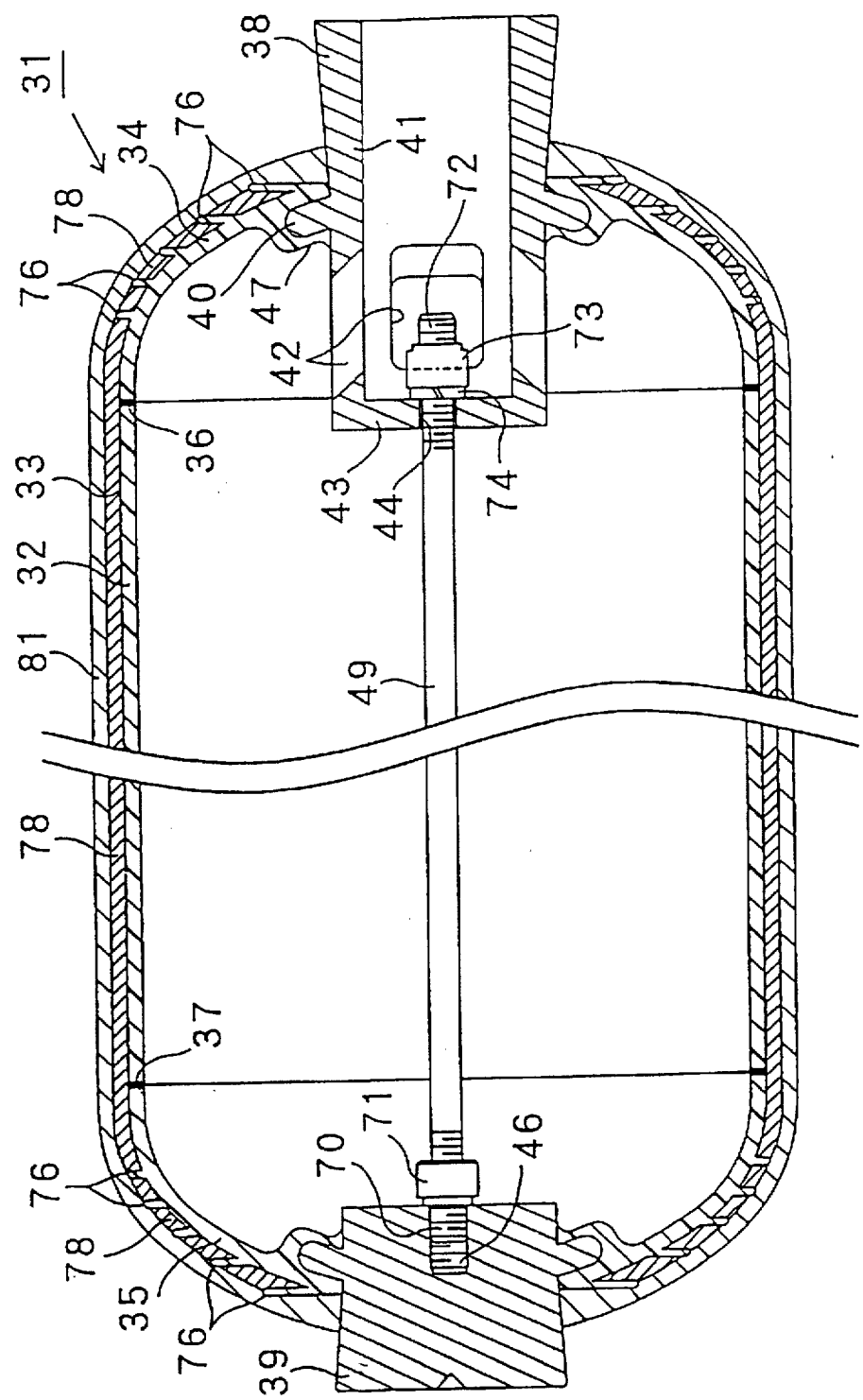
FIG. 10 is a cross-sectional view of a pressure vessel according to a still different embodiment of the invention with a middle section omitted.
Figure 11:
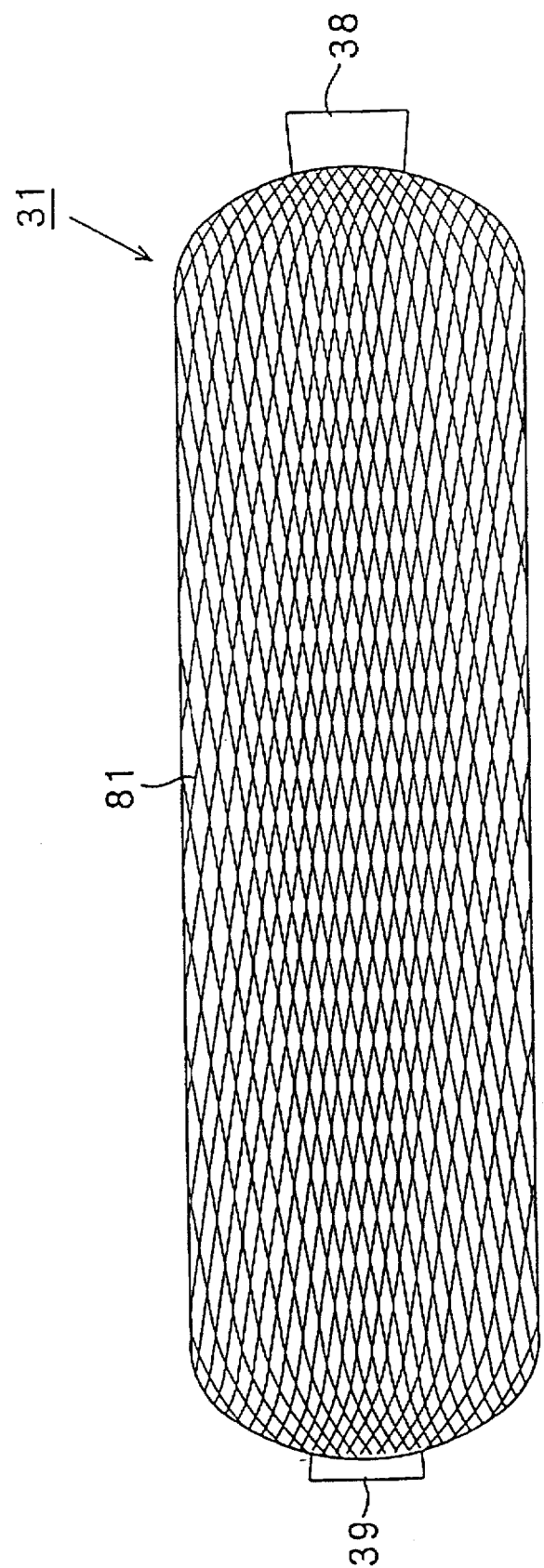
FIG. 11 is a front view of the same pressure vessel as that of FIG. 10.
Figure 12:
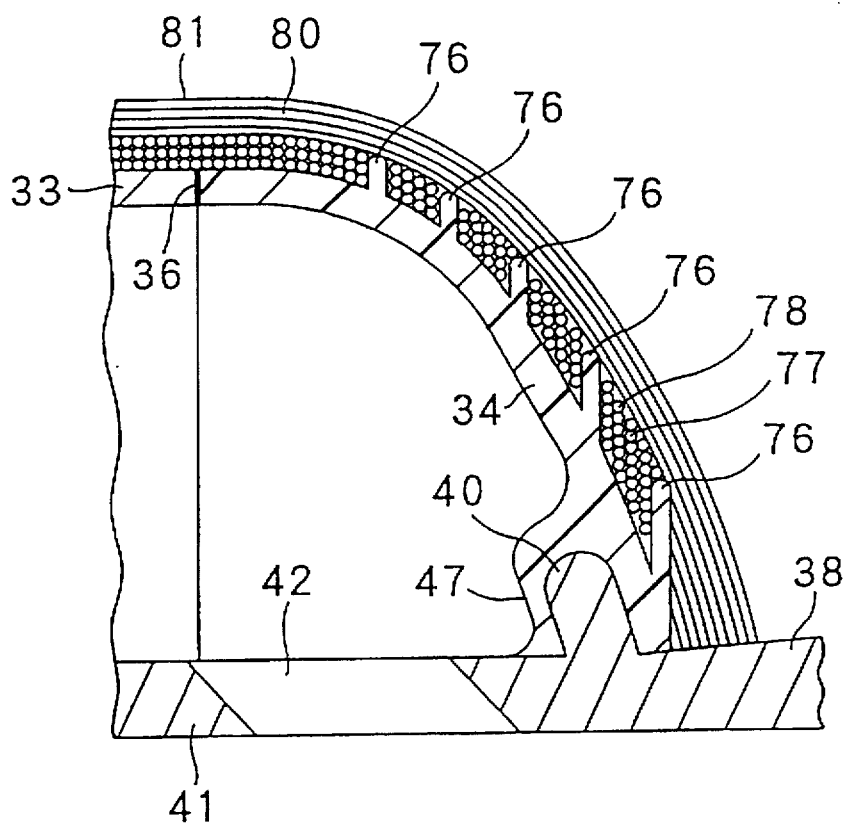
FIG. 12 is a cross-sectional view showing essential portions of the same pressure vessel.

FIGS. 10~13 show a pressure vessel 31 of a seventh embodiment. A liner 32 forming the inner most layer of the pressure vessel 31 includes, as shown in FIG. 10, a cylindrical peripheral wall member 33 made of polyethylene resin, polyamide resin or polyester resin, and right and left bowl-shaped end wall members 34, 35 made of polyethylene resin, polyamide resin or polyester resin. The end wall members 34, 35 close both ends of the peripheral wall member 33. Each of the end wall members 34, 35 is welded to the peripheral wall member 33 by means of butt welds 36, 37. The inside measurements of the liner 32 are 220 mm in diameter and 900 mm in length.

Metallic sleeves 38, 39 are fixed to the centers of the right and left end wall members 34, 35. The right sleeve 38 is formed in a cylindrical shape having a bottom wall 43 in such a manner that a flange 40 is formed on an outer periphery thereof and a plurality of gas ports 42 and a through hole 44 are formed in a cylindrical wall 41 and the bottom wall 43. A joint (not shown) for a pipe, through which CNG is let in and out, is to be connected to the sleeve 38. The left sleeve 39 is formed in a generally cylindrical shape in such a manner that a flange 45 is formed on an outer periphery thereof and an internal thread hole 46 is formed by cutting through an inner end surface thereof.

The end wall members 34, 35 are formed by injection molding with the sleeves 38, 39 placed in dies as insert. Therefore, the flanges 40, 45 are wrapped up in the inner edge portions 47, 48 of the end wall members 34, 35. In this way, the end wall members 34, 35 and the sleeves 38, 39 are fixed to each other.

Both sleeves 38, 39 are connected to each other by means of a metallic connecting shaft 49 extending within the liner 32. The left end of the connecting shaft 49 is combined with the sleeve 39 by screwing an external thread 70 cut on this left end into the internal thread hole 46 of the sleeve 39 and fastening a nut 71 screwed on the external thread 70 to the inner end surface of the sleeve 39. The right end of the connecting shaft 49 is combined with the sleeve 38 by inserting an external thread 72 cut on this right end through the through hole 44 of the sleeve 38 and through a spring washer 74 and fastening a nut 73 screwed on the external thread 72 to the bottom wall 43.

The spring washer 74 is used to compensate for an axial thermal expansion of the liner 32. By adjusting the clearance between the nut 73 and the bottom wall 43, a moderate movement of the sleeves 38, 39, caused by the stress concentrated on the sleeves 38, 39 and the end wall members 34, 35 in charging CNG under high pressure, is permitted while, at the same time, the upper limit of the amount of this movement is regulated.

Figure 13:
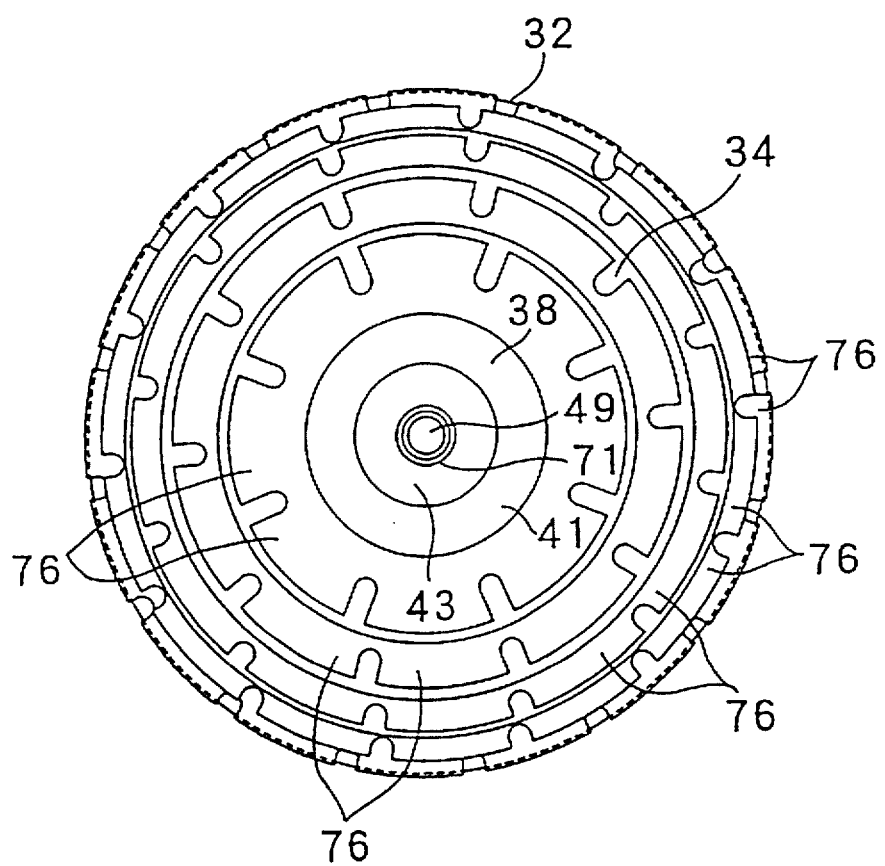
FIG. 13 is a side view of a liner of the same pressure vessel.
Figure 14:
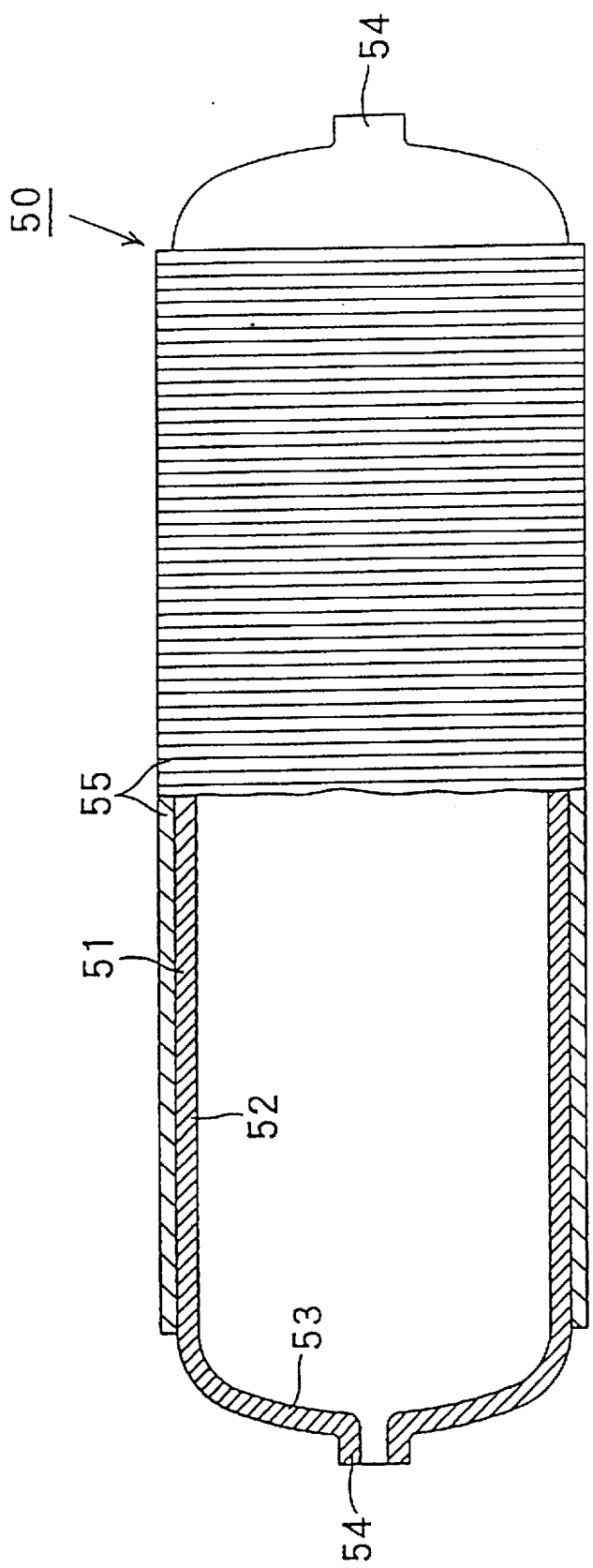
FIG. 14 is a partially broken-away front view of a conventional pressure vessel.
Figure 15:
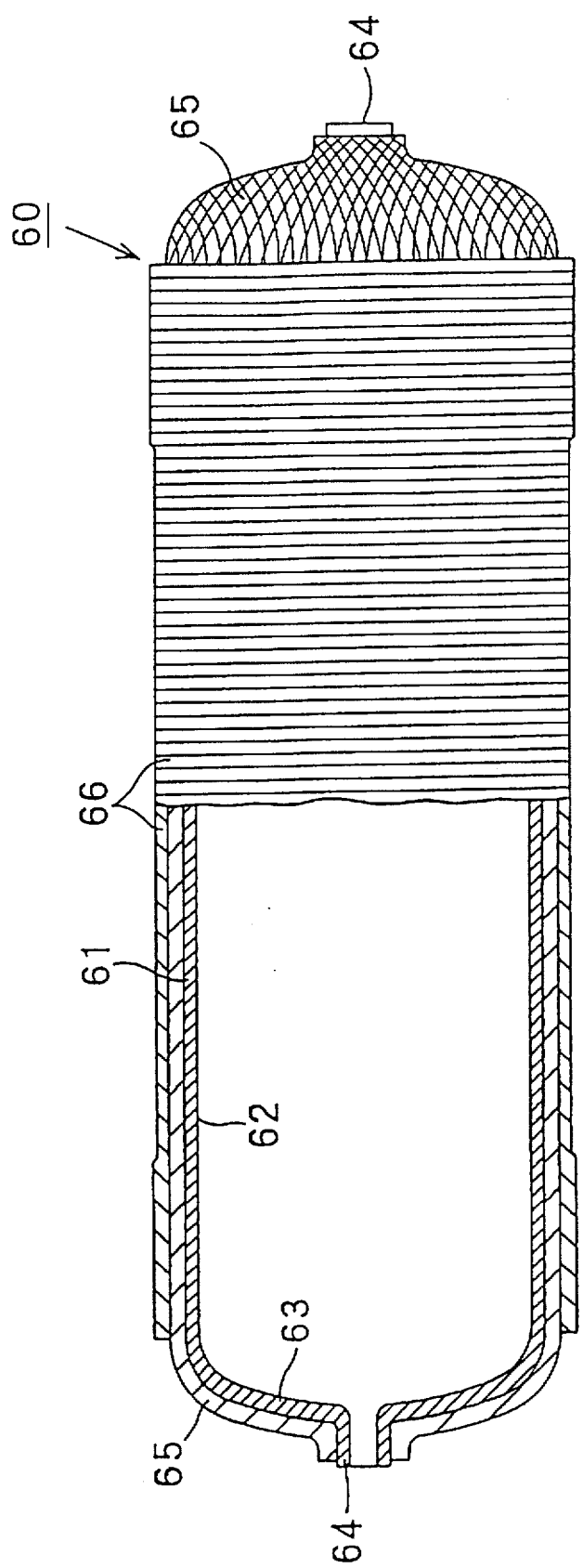
FIG. 15 is a partially broken-away front view of another conventional pressure vessel.

The end wall members 34, 35 are formed integrally with fiber retaining ribs 76 on the outer surface thereof. Such of the ribs 76 is made of the same resin as the end wall members 34, 35. Each of the end wall members 34, 35 is formed with five annular and coaxial rows of fiber retaining ribs 76. As shown in FIG. 13, each row includes a plurality of fiber retaining ribs 76 arranged with a gap left therebetween. The heightwise direction of the fiber retaining ribs 76 corresponds to the direction perpendicular to the axis of the end wall members 34, 35, while the lengthwise direction of the fiber retaining ribs 76 corresponds to the circumferential direction of the end wall members 34, 35.

Carbon fiber 77 (filament) is hooped on the whole outer surface of each of the end wall members 34, 35 in the circumferential direction while being retained by the fiber retaining ribs 76 in each row. The carbon fiber 77 is continuous, and therefore it is passed through the gap between the fiber retaining ribs 76 in case shifting of the fiber from the fiber retaining ribs 76 in one row to those in the adjacent row occurs. In this way, the carbon fiber 77 is wound to generally fill the spaces between the fiber retaining ribs 76 so as to cause no bumps to appear on the outer surface. Further, the carbon fiber 77 is hooped on the outer surface of the end wall member 34, is continuously hooped around the peripheral wall member 33 as well, and then is hooped on the outer surface of the end wall member 35. The hooped carbon fiber 77 is impregnated with epoxy resin to form the hooped reinforcing layer 78. This reinforcing layer 78 has a thickness of 3~7 mm.

Around the hooped reinforcing layer 78 is provided a helical reinforcing layer 81 which is formed by winding carbon fiber 80 (filament) helically in the generally axial direction (or at a slight angle with respect to the axis) in such a manner as to pass over the end wall members 34, 35 on both sides and impregnating this carbon fiber 80 with epoxy resin. This reinforcing layer 81 has a thickness of 3~7 mm.

An example of the process of manufacturing the above-described pressure vessel 31 will now be described as follows:

1. Separately form the peripheral wall member 33, the right end wall member 34 and the left end wall member 35 by injection molding. The end wall members 34, 35 are formed integrally with the sleeves 38, 39 placed in dies as insert at the time of injection molding.
2. Weld the peripheral wall member 33 and the left end wall member 35 to each other by means of the weld 37.
3. Combine the left end of the connecting shaft 49 with the sleeve 39.
4. Weld the peripheral wall member 33 and the right end wall member 34 to each other by means of the weld 36. At this time, insert the right end of the connecting shaft 49 through the through hole 44 of the sleeve 38. It is advisable for easy insertion to take measures such as to attach a guide member (not shown) to the tip end of the shaft.
5. Combine the right end of the connecting shaft 49 with the sleeve 38.
6. Form the hooped reinforcing layer 78. Formation of this layer 78 is performed in such a manner that, while the liner 32 is supported at the sleeves 38, 39 and rotated on its axis, the carbon fiber 77 impregnated with epoxy resin is wound around the liner 32.
7. Form the helical reinforcing layer 81. Formation of this layer 81 is performed in such a manner that, while the liner 32 is supported at the sleeves 38, 39 and rotated in the required direction, the carbon fiber 80 impregnated with epoxy resin is uniformly wound around the hooped reinforcing layer 78 at an angle at which the carbon fiber effectively shows the strength characteristics.

According to the pressure vessel 31 of this embodiment, the fiber retaining ribs 76 are formed on the outer surface of each of the end wall member 34, 35, and therefore, it becomes possible to hoop in the circumferential direction, which has been an impossibility for the conventional technology. As a result, the hooped reinforcing layer 78 works on the radial component of the stress applied to the end wall members 34, 35, while the helical reinforcing layer 81 works on the axial component thereof. Accordingly, the reinforcing layers 78, 81 have the reinforcing effect on the end wall members 34, 35 very effectively, and therefore, it is possible to reduce the thicknesses of the end wall members 34, 35 and the reinforcing layers 78, 81 as well as to enhance the pressure tightness of the end wall members 34, 35 as compared with the case of relying on the helical winding alone. Further, the fiber retaining ribs 76 also have the effect of reinforcing the end wall members 34, 35, and therefore, it becomes possible to make the end wall members 34, 35 thinner from this point of view as well. Accordingly, it is possible to reduce the weight of the pressure vessel 31 and hence to improve the fuel consumption and weight balance of the automobile mounted with this pressure vessel 31.

When a joint (not shown) is connected to the sleeve 38 and CNG is charged into the pressure vessel 31 under high pressure, the stress is concentrated on the sleeves 38, 39 and the end wall members 34, 35. However, the sleeves 38, 39 connected by the connecting shaft 49 move in moderation until they can move no more as described above. Accordingly, the stress is not concentrated merely on the sleeves 38, 39 but distributed all over the end wall members 34, 35 so as to prevent the sleeves 38, 39 from moving to excess (or sticking out).

The present invention is not limited to the above-described embodiments but may be practiced or embodied by modifying appropriately without departing from the spirit or essential characteristics thereof as described in the following, for instance:

1. To change the dimensions and configuration of each section.
2. To embody as a pressure vessel for charge of all kinds of pressurized substances other than CNG. For instance, in the case of LNG, the internal pressure is approximately 50 kg/cm2, and in the case of LPG, the internal pressure is approximately 35 kg/cm2, and therefore designing of strength becomes easier than in the aforesaid embodiments, which makes it possible to easily achieve the embodiment.
3. To replace the spring washer 74 in the seventh embodiment with every kind of spring such as a coned disc spring, a coiled spring and so on.
4. To change the manufacturing method and process. For example, in the seventh embodiment, after the sleeves 38, 39 are connected by means of the connecting shaft 49 in advance of being fixed to the end wall members 34, 35, the liner 32 may be formed therearound by means of rotary molding, blow molding and the like.
5. In the seventh embodiment, to replace the connecting shaft 49 with a connecting wire. In this case, if the slack of connecting wire corresponding to the set values of thermal expansion of the liner 32 and so on is beforehand allowed for, it becomes unnecessary to adjust the clearance by means of the nut 73.

As has been described above in detail, according to the present invention, it is possible to produce a lightweight pressure vessel easily and at a low cost.

What is claimed is:

1. A pressure vessel comprising:
   a liner including an end wall assembly formed by connecting two rigid end wall members at a fixed distance from each other by means of a connecting member, and an elastic peripheral wall sheet fixed to the end wall assembly to enclose a space between said two end wall members; and
   a reinforcing layer disposed around said liner,
   wherein said peripheral wall sheet comprises a permeable main body sheet and an impermeable layer disposed on the permeable sheet.
2. A pressure vessel according to claim 1, wherein said reinforcing layer is made of fiber-reinforced plastics and is formed by winding fiber around the liner and impregnating the fiber with resin.
3. A pressure vessel according to claim 1, wherein said reinforcing layer comprises a helical reinforcing layer made of fiber-reinforced plastics which is formed by winding fiber around the liner in a lengthwise direction in such a manner as to pass over the end wall members on both sides and impregnating the fiber with resin; and a hooped reinforcing layer made of fiber-reinforced plastics which is formed by winding fiber around said helical reinforcing layer in a circumferential direction and impregnating the fiber resin.
4. A pressure vessel comprising:
   a cylindrical section;
   two bowl-shaped end wall sections wherein each of the end wall sections is disposed on an end of the cylindrical section,
   wherein a fiber retaining rib is formed on an outer surface of each of said end wall sections; and
   a reinforcing layer formed by winding fiber on the outer surface of said end wall section in a circumferential direction such that the fiber is retained by said fiber retaining rib.
5. A pressure vessel according to claim 4, wherein said end wall sections are made of synthetic resin and wherein the end wall sections include a metallic sleeve fixed to a central portion of each of said end wall sections.
6. A pressure vessel according to claim 4, wherein a heightwise direction of said fiber retaining rib generally corresponds to a direction perpendicular to an axis of the end wall section.
7. A pressure vessel according to claim 4, wherein a lengthwise direction of said fiber retaining rib corresponds to a circumferential direction of the end wall section.
8. A pressure vessel according to claim 7, wherein at least two annular and coaxial rows of said fiber retaining ribs are formed, and a gap is formed in the fiber retaining rib in each row.
9. A pressure vessel comprising:
   a cylindrical section;
   two end wall sections wherein each of the end wall sections is disposed on an end of the cylindrical section; and
   a connecting member connecting each of the two end wall sections together,
   wherein the two end wall sections are made of synthetic resin and wherein each of the two end wall sections include a sleeve made of one of metal and synthetic resin fixed to a central position of said end wall member, the connecting member being connected to the sleeves,
   wherein one of said sleeves is formed in a cylindrical shape having a bottom wall, the bottom wall defining a through hole therethrough, wherein an end portion of said connecting member is inserted through said through hole, and a nut is screwed onto an external thread cut into the end portion, wherein a spring member is disposed between the bottom wall and the nut, the spring member compensating for thermal expansion of the pressure vessel.

* * * * *